United States Patent [19]

Lee

[11] Patent Number: 5,040,087

[45] Date of Patent: Aug. 13, 1991

[54] MAGNETIC HEAD HAVING COMBINED READING AND ERASING SECTION

[75] Inventor: Sung-Hyun Lee, Anyang, Rep. of Korea

[73] Assignee: Ricoh Company, Ltd., Tokyo, Japan

[21] Appl. No.: 379,066

[22] Filed: Jul. 13, 1989

[30] Foreign Application Priority Data

Jul. 13, 1988 [KR] Rep. of Korea ............... 19888713

[51] Int. Cl.⁵ .................... G11B 5/265; G11B 5/596
[52] U.S. Cl. ................................ 360/121; 360/77.07
[58] Field of Search ............... 360/121, 77.06, 77.07

[56] References Cited

U.S. PATENT DOCUMENTS

| | | | |
|---|---|---|---|
| 2,653,189 | 9/1953 | Camras | 360/121 |
| 3,504,134 | 3/1970 | Miyata | 360/121 |
| 3,514,851 | 6/1970 | Perkins et al. | 360/121 |
| 3,562,443 | 2/1971 | Bos et al. | 360/121 |
| 4,701,815 | 10/1987 | Yada et al. | 360/77.06 |
| 4,729,040 | 3/1988 | Miyake | 360/77.06 |

*Primary Examiner*—A. J. Heinz
*Assistant Examiner*—Jefferson Evans
*Attorney, Agent, or Firm*—Oblon, Spivak, McClelland, Maier & Neustadt

[57] ABSTRACT

The magnetic head of the present invention comprises a recording head section having a first gap of a given width and a reading/erasing head section having a second gap. The middle portion of the second gap is straight by the given width, and parallel with the gap of the recording head section. Both side portions of the second gap are symmetrically bent at an angle towards the recording head section so that the magnetic head can prevent the data error while reading information from a diskette.

20 Claims, 4 Drawing Sheets

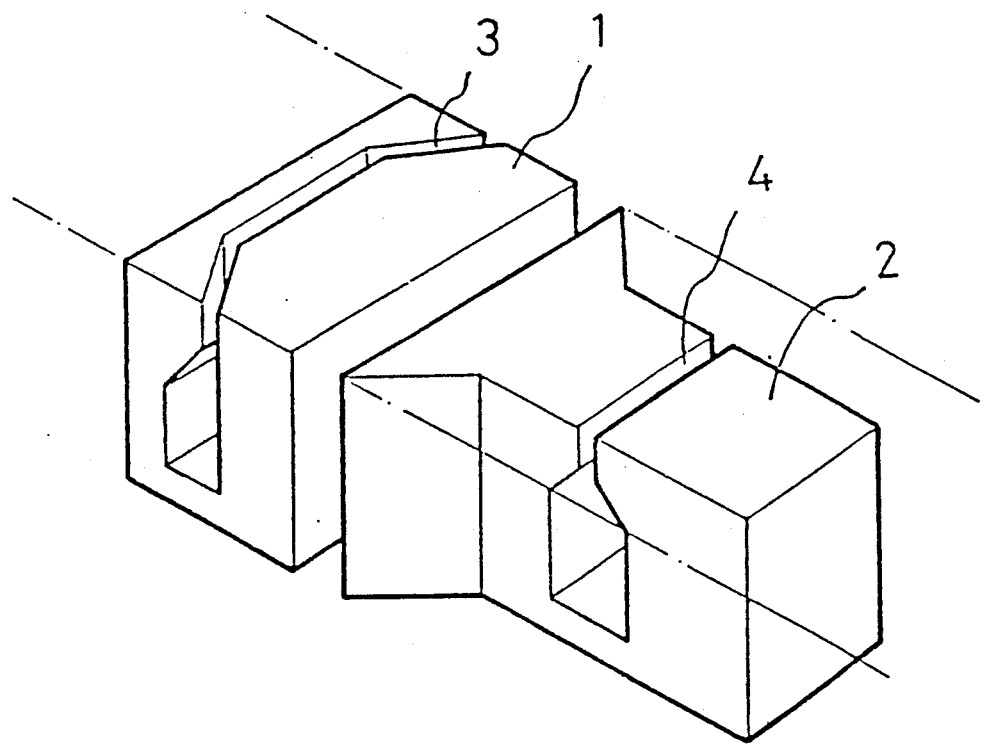
F I G. 1

MAGNETIC HEAD HAVING COMBINED READING AND ERASING SECTION

BACKGROUND OF THE INVENTION

The present invention concerns a magnetic head mounted on a floppy disk driver for reading, from recording to or erasing information from on a diskette.

The floppy diskette, used as a recording medium of a computer, is magnetized by the magnetic head to record information, the recorded informations is then read by the magnetic head.

Though the principle of recording and reading information using a magnetic head is the same with a conventional recording tape and its peripheral technologies the difference between the magnetic head for reading information from a diskette and the conventional sound recorder lies in the fact that the magnetic head has a high-density structure so that a great amount of information may be recorded on the diskette.

The conventional high-density magnetic head, as shown in FIG. 4, includes an erasing head section A and a recording/reading head section B arranged in parallel with a space between and a ceramic casing C enclosing the sections. The width of the erasing head section is slightly wider than that of the recording/reading head section B.

The two head sections A and B respectively have in their midsection a straight gap A', B' where a magnetic field is formed to record and read information, as is well known in the art.

The processing of information on a diskette with the conventional magnetic head will be described hereinafter. As shown in FIG. 5, if the track of the diskette is in the IBM basic format, and a gap B' of the recording/reading head section B is in a position where it does not correspond with the synchronizing signal SYNC of track, the searching of the diskette continues. After the gap B' is synchronized with the synchronizing signal SYNC, it moves to address mark A/M to sense it. After sensing the address mark A/M, the recording/reading head section B proceeds to record or read information, or the erasing head section A proceeds to erase information.

In this case, after the information recorded on the track of the diskette is erased to record new information, there remains, on the track of the diskette a non-erased portion D that corresponds to the space between the gap A' of the erasing heads section A and the gap B' of the recording/reading head section B, as shown in FIG. 6. This non-erased portion D causes interference when reading information on an adjacent track. Therefore, data errors occur so that compatibility with the IBM basic format is impossible.

SUMMARY OF THE INVENTION

The object of the present invention is to provide a magnetic head wherein the reading function is imparted to the erasing head section, whose configuration is improved, to eliminate the non-erasing portion, thereby attaining compatibility with the IBM basic format.

According to the present invention, a magnetic head includes a recording head section having a gap of a given width, and a reading/erasing head section having another gap, the middle portion of the other gap being straight by the given width and parallel to the gap of the recording head section, both side portions of the other gap being symmetrically bent at an angle towards the recording head section.

BRIEF DESCRIPTION OF THE ATTACHED DRAWINGS

For a better understanding of the invention and to show how the same may be carried into effect, reference will now be made, by way of example, to the accompanying diagrammatic drawings, in which:

FIG. 1 is a perspective view of the inventive structure;

DETAILED DESCRIPTION OF THE PREFERRED EMBODIMENT

The present invention will now be described more specifically with reference to the drawings attached only by way of example.

Referring to FIG. 1, the magnetic head of the present invention includes a reading/erasing head section 1 and a recording head section 2. Both head sections 1 and 2 respectively have in their middle portions a gap 3, 4, as in the conventional head. Particularly, the middle portion of the gap 3 is straight, and both side portions thereof are bent symmetrically, thereby forming a (-shaped gap.

Figure 2:
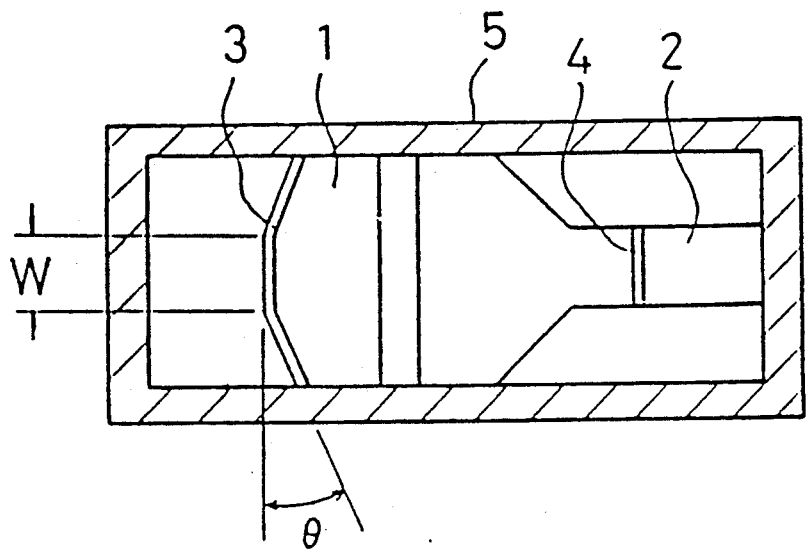
FIG. 2 is a plane view of the inventive structure.

As shown in FIG. 2, the reading/erasing head section 1 and the recording head section 2 are arranged in a ceramic casing 5 with a given space therebetween. The middle portion of the gap 3 is parallel with the gap 4 and has the same length W as the gap 4. Both side portions of the gap 3 are symmetrically bent at angle $\theta$ towards the recording head 2. The angle $\theta$ directly serves to eliminate the non-erasing portion, and has the range of one degree to sixty degrees, preferably five degrees to twenty-five degrees.

Outside the recording head section 2 and the reading/erasing head section 1 is installed a bobbin having a coil to produce magnetic fields in the gaps 4 and 3.

The processing of information according to the inventive structure is described hereinbelow.

Figure 3:
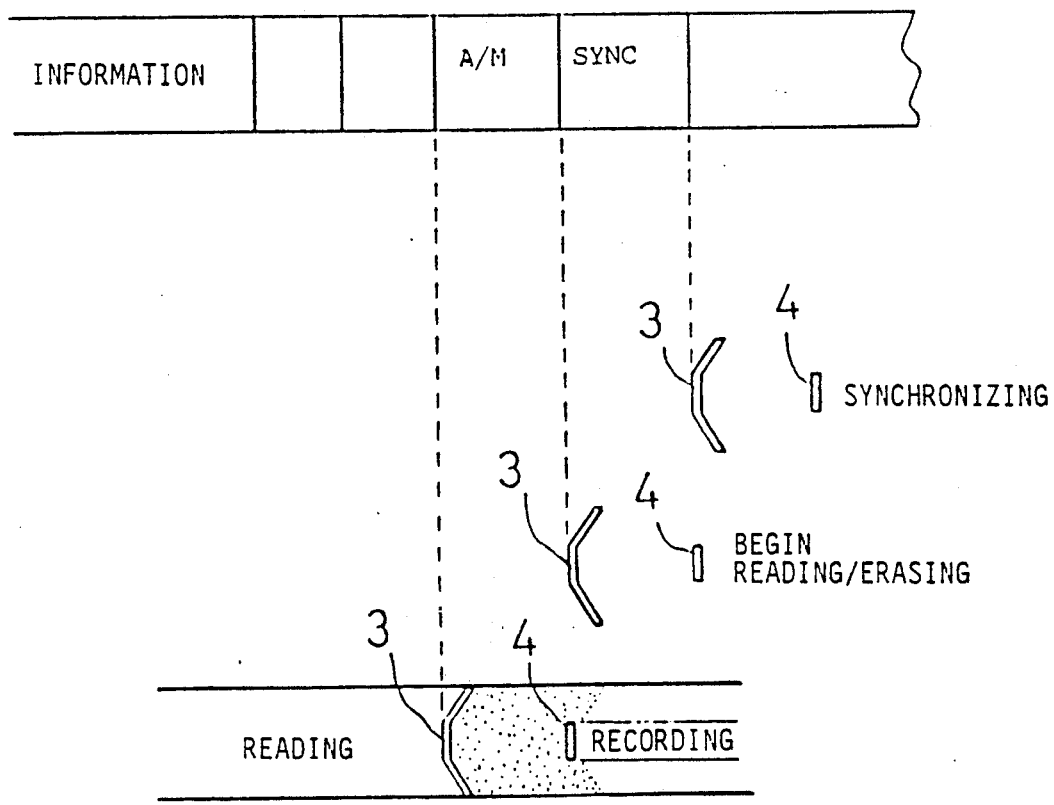
FIG. 3 is a view for illustrating an erasing and recording operation according to the present invention.
Figure 4:
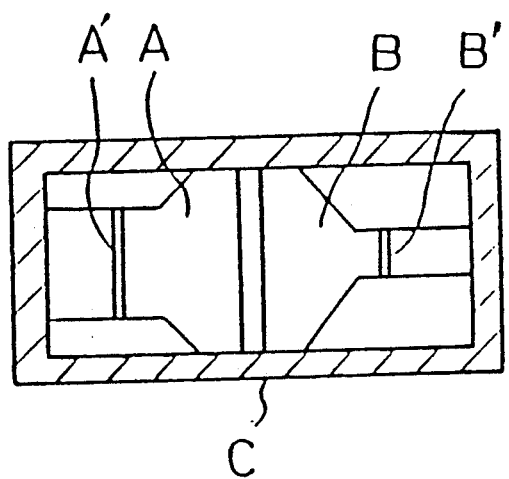
FIG. 4 is a plane view of the conventional magnetic head.
Figure 5:
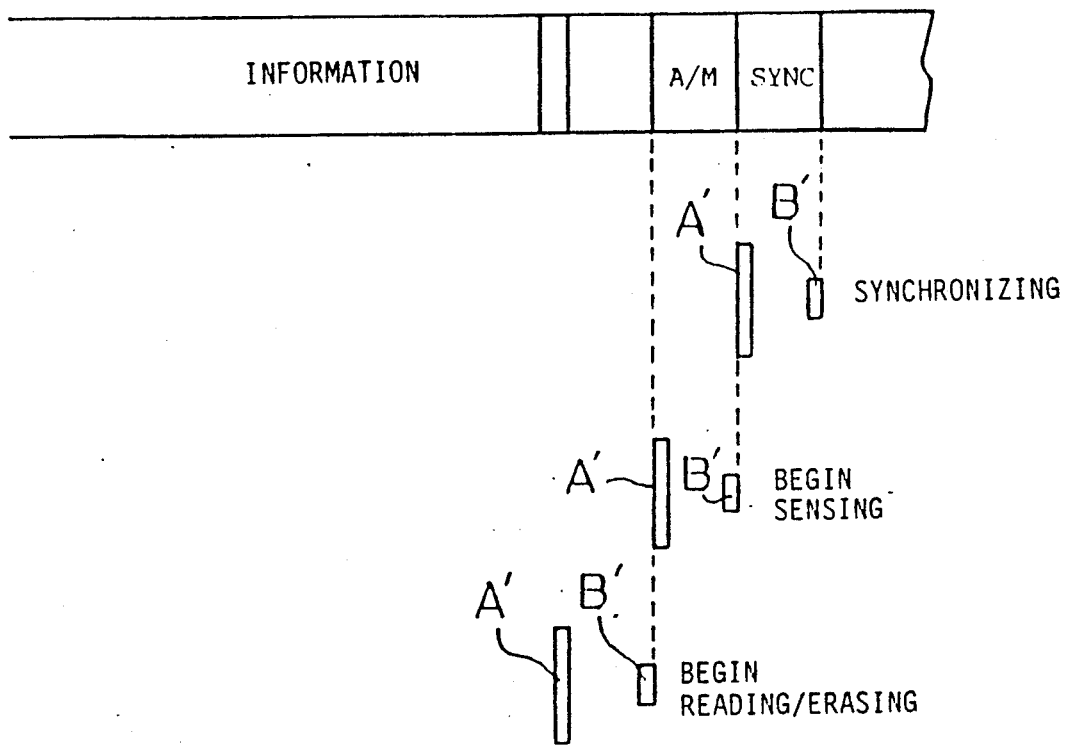
FIG. 5 is a view for illustrating the erasing and recording according to the magnetic head of FIG. 4.
Figure 6:
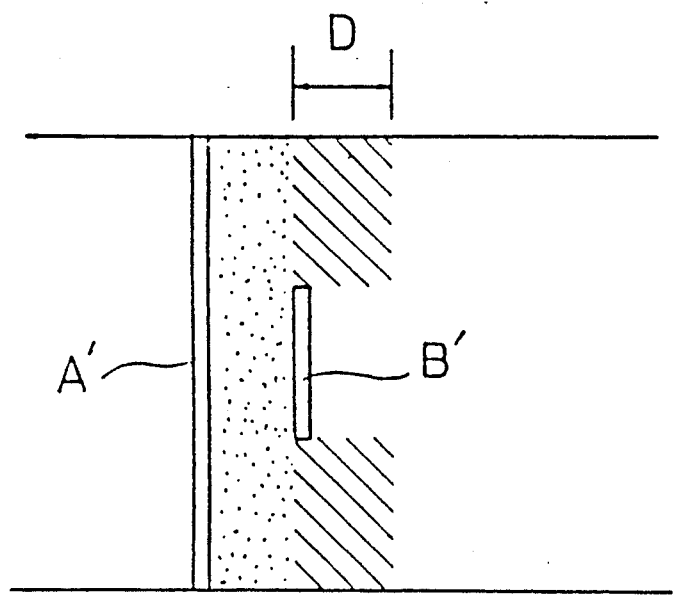
FIG. 6 is an enlarged view for illustrating the diskette track changing according to the magnetic head of FIG. 4.

Referring to FIG. 3, in order to reading information, the reading/erasing head section 1 is synchronized with a synchronizing signal SYNC, and moved to the address mark A/M to sense the information recorded on the disk track.

The recording head section 2 can begin to record information on the diskette when the reading/erasing head section 1 senses the address mark A/M. Also, since both side portions of the gap 3 are bent towards the recording head section 2, the non-erasing portion caused by the conventional magnetic head is not produced, thereby preventing data errors. Further, even if the track density is increased, the magnetic head of the present invention may be effectively used because error producing is radially prevented.

As described above, the present invention solves the problems caused by the non-erasing portion, so that compatibility with the IBM basic format is obtained, and the scope of using the software may be expanded.

While the invention has been particularly shown and described with reference to a preferred embodiment, it will be understood by those skilled in the art that modifications in detail may be made without departing from the spirit and scope of the invention.

What is claimed is:

1. A magnetic head mounted on a floppy disk driver for reading information on a diskette, comprising:
   a recording head section having a first gap of a given length; and
   a reading/erasing head section having a second gap, a pair of side portions joined to opposite ends of a middle portion of said second gap being straight with a length equal to the length of said first gap of said recording head section and both side portions of said second gap being symmetrically bent at an angle $\theta$ towards said recording head section.

2. The magnetic head as claimed in claim 1, wherein said angle $\theta$ is within a range from one degree to sixty degrees.

3. The magnetic head as claimed in claim 1, wherein both side portions of said second gap are symmetrically bent at an angle $\theta$ allowing said second section to read/erase information on a diskette.

4. The magnetic head as claimed in claim 1, wherein said angle is within a range from five degrees to twenty-five degrees.

5. A magnetic head mountable on a floppy disk driver for reading information on a diskette, comprising:
   a recording head section having a first gap of a given length; and
   erasing means for erasing information stored on a diskette and for reading information from the diskette, said erasing means having an erasing head section separated by a space from said recording head section, having a second gap with a centrally positioned straight middle portion defining a second length equal to said given length of said recording head and second and third portions each symmetrically extending away from opposite ends of said middle portion to define an angle relative to said middle portion, and towards said recording head section.

6. The magnetic head as claimed in claim 5, wherein said angle is within a range from one degree to sixty degrees.

7. The magnetic head as claimed in claim 5, wherein said angle is within a range from five degrees to twenty-five degrees.

8. The magnetic head of claim 5, further comprised of said second and third portions being symmetrically bent at said angle to enable said erasing means to read or erase information on a diskette.

9. A method for recording and erasing information on a diskette, comprising the steps of:
   synchronizing a reading/erasing head having an erasing head section separated by a space from a recording head section, said reading/erasing head having a first gap with a centrally positioned straight middle portion defining a first length and second and third portions each symmetrically extending away from opposite ends of said middle portion to define an angle relative to said middle portion and towards said recording head section, with a synchronizing signal of the diskette with said middle portion positioned adjacent said synchronizing signal and said second and third portions extending away from said synchronizing signal;
   moving said reading/erasing head to sense an address mark on the diskette after synchronization;
   writing information to the diskette after the address mark is sensed by said reading/erasing head by writing said information with said recording head having a second gap parallel to and equal in length to said first length;
   synchronizing the reading/erasing head with the synchronizing signal;
   moving said reading/erasing head to the address mark after said step of synchronizing; and
   erasing information stored in the diskette upon sensing of the address mark.

10. The method as claimed in claim 9, further comprising the step of erasing information at the beginning of the address mark.

11. The method of claim 10, further comprised of subjecting a first area on the diskette to said step of writing information and subjecting a second area on the diskette to said step of erasing, said second area having a greater width than said first area.

12. The method of claim 9, further comprised of subjecting a first area on the diskette to said step of writing information and subjecting a second area on the diskette to said step of erasing, said second area having a greater width than said first area.

13. A method for recording and erasing of a diskette, comprising the steps of:
   synchronizing a reading/erasing head section having an erasing head section separated by a space from a recording head section, said reading/erasing head section having a first gap with a centrally positioned straight middle portion defining a first length and second and third portions each symmetrically extending away from opposite ends of said middle portion to define an angle relative to said middle portion, and towards said recording head section, with a synchronizing signal of the diskette with said middle portion positioned adjacent said synchronizing signal and said second and third portions extending away from said synchronizing signal;
   moving said reading/erasing head to an address mark on the diskette after said step of synchronizing;
   writing information to a first area of the diskette after the address mark is sensed by said reading/erasing head by writing said information with said recording head having a second gap parallel to and equal in length to said first length;
   synchronizing the reading/erasing head with the synchronizing signal;
   moving said reading/erasing head section to the address mark after said step of synchronizing; and
   erasing from the beginning of the address mark, information stored within a second area of the diskette, said second area having a greater width than the first area, upon sensing the address mark.

14. A magnetic head mountable on a disk driver for reading information on a diskette, comprising:
   a first section having a first gap of a first length; and
   a second section spaced apart from said first section and having a second gap with a centrally disposed straight middle portion defining a second length substantially equal to said first length of said first section, and second and third portions extending obliquely away from opposite ends of said middle portion and towards said first section.

15. The magnetic head as claimed in claim 14, further comprised of said second and third portions being symmetrically oriented relative to said middle portion.

16. The magnetic head as claimed in claim 15, wherein said first section is a recording head section and said second section is a reading and erasing head section.

17. The magnetic head as claimed in claim 14, wherein said second and third portions are oriented at angles within the range from one degree to sixty degrees relative to said middle portion.

18. The magnetic head as claimed in claim 14, wherein said second and third portions are oriented at angles within the range from five degrees to twenty-five degrees relative to said middle potion.

19. The magnetic head as claimed in claim 14, wherein said first section is a recording head section and said second section is a reading and erasing head section.

20. The magnetic head as claimed in claim 14, further comprised of said second and third portions being symmetrically bent at an angle to enable said second section to read or erase information on a diskette.

* * * * *

UNITED STATES PATENT AND TRADEMARK OFFICE
CERTIFICATE OF CORRECTION

PATENT NO. : 5,040,087

DATED : Aug. 13, 1991

INVENTOR(S) : Sung-Hyun Lee

It is certified that error appears in the above-identified patent and that said Letters Patent is hereby corrected as shown below:

On the title page the assignee should read:

(73) Assignee:

Sam Sung Electronics Co., Ltd,
Republic of Korea

Attorney, Agent, or Firm should read:
--Robert E. Bushnell, Esq.

Signed and Sealed this

Fifth Day of November, 1991

*Attest:*

HARRY F. MANBECK, JR.

*Attesting Officer*  *Commissioner of Patents and Trademarks*